(12) United States Patent
Dickerson (10) Patent No.: US 10,729,963 B1
(45) Date of Patent: Aug. 4, 2020

(54) BUCKET CADDY

(71) Applicant: Rukket, LLC, Wilmington, DE (US)

(72) Inventor: Ryan L. Dickerson, Athens, GA (US)

(73) Assignee: Rucket, LLC, Wilmington, DE (US)

( * ) Notice: Subject to any disclaimer, the term of this patent is extended or adjusted under 35 U.S.C. 154(b) by 0 days.

(21) Appl. No.: 16/374,799

(22) Filed: Apr. 4, 2019

Related U.S. Application Data (60) Provisional application No. 62/676,048, filed on May 24, 2018.

(51) Int. Cl.
| | | |
|---|---|---|
| *A63B 47/00* | (2006.01) | |
| *A63B 67/00* | (2006.01) | |
| *A63B 71/02* | (2006.01) | |
| *F16M 11/04* | (2006.01) | |
| *F16M 11/16* | (2006.01) | |
| *F16M 11/32* | (2006.01) | |
| *F16M 11/24* | (2006.01) | |
| *A63B 67/06* | (2006.01) | |
| *A63B 63/00* | (2006.01) | |
| *F16M 13/00* | (2006.01) | |

(52) U.S. Cl.
CPC ............ *A63B 71/023* (2013.01); *A63B 47/00* (2013.01); *F16M 11/242* (2013.01); *A63B 63/00* (2013.01); *A63B 67/06* (2013.01); *F16M 11/04* (2013.01); *F16M 11/16* (2013.01); *F16M 11/32* (2013.01); *F16M 13/00* (2013.01); *F16M 2200/06* (2013.01)

(58) Field of Classification Search
CPC ........ F16M 11/04; F16M 11/16; F16M 11/32; F16M 11/242; F16M 13/00; F16M 2200/08; F16M 2200/06; A47G 23/04; A63B 71/023; A63B 67/06; A63B 63/00; A63B 63/08
USPC ..... 248/127, 150, 151, 163.1, 164, 165, 166
See application file for complete search history.

(56) References Cited

U.S. PATENT DOCUMENTS

| | | | | |
|---|---|---|---|---|
| 1,371,263 | A * | 3/1921 | Reed ...................... | A47B 13/04 248/150 |
| 2,190,623 | A * | 2/1940 | Benson ..................... | D06F 1/00 248/150 |
| 2,749,147 | A * | 6/1956 | Herrschaft ............... | A47B 3/12 248/431 |
| 7,896,350 | B2 * | 3/2011 | Harries .................. | A63B 63/08 273/402 |

(Continued)

*Primary Examiner* — Tan Le
(74) *Attorney, Agent, or Firm* — Rogowski Law LLC (57) ABSTRACT

A bucket caddy stably holds a bucket above a horizontal support surface or ground for easier access to the contents of the bucket. The bucket caddy has a retainer with slots into which at least three legs are movably joined. The legs each have a shelf surface and a U-shaped hook disposed at their proximal ends. When splayed apart, the shelf surfaces point radially inwardly toward the retainer with their top surfaces in a common plane onto which the bottom of the bucket may be positioned. The U-shaped hooks receive elastic bands, each of which has an S-shaped hook at its opposite end adapted to join a portion of a rim of the bucket. After the bucket is separated from the caddy, the legs rotate so that their central axes are parallel or substantially parallel to one another in a storage configuration. A hook and loop fastener tape wraps around the legs in the storage configuration.

16 Claims, 6 Drawing Sheets

(56) References Cited

U.S. PATENT DOCUMENTS

| | | | | |
|---|---|---|---|---|
| 8,444,097 B2 * | 5/2013 | Morrow | ............... | F16M 11/245 |
| | | | | 248/150 |
| 9,220,339 B1 * | 12/2015 | Chen | ...................... | A63B 47/00 |
| 9,625,085 B1 * | 4/2017 | Jones | ....................... | B25H 1/08 |
| 2003/0150964 A1 * | 8/2003 | Sherer | ...................... | B25H 3/02 |
| | | | | 248/146 |
| 2008/0169389 A1 * | 7/2008 | Hill | ........................ | F16M 11/22 |
| | | | | 248/166 |

* cited by examiner

BUCKET CADDY

This application claims priority under 35 USC § 119(e) to U.S. Provisional Application Ser. No. 62/676,048, entitled "Bucket Caddy", filed May 24, 2018, the disclosure of which is incorporated by reference herein.

FIELD OF THE INVENTION

The present invention is generally directed to a stand to which a bucket may be attached to hold the bucket a distance above a horizontal support surface.

BACKGROUND OF THE INVENTION

Baseball and softball coaches and players toss or throw multiple balls to their team players for batting practice and defensive practice. Baseball and softball pitchers throw multiple balls in pitching practice. Frequently, a 5- or 6-gallon bucket that is filled with multiple balls is placed near a coach or player from which the coach or player may select a next ball for a practice toss, throw or pitch. In many cases, such bucket is seated on a ground surface, such that the coach or player must bend down to select the next ball from the bucket. Repetitive bending may unnecessarily stress the coach or player's back.

Stands to hold practice balls above a ground surface are known. Jugs Sports offers a "Back Saver Ball Basket" with a canvas "basket" container over a foldable cage that can hold practice balls above a ground surface. Although the product is marketed to hold the practice balls directly in the canvas container, the user has an option to place a bucket filled with balls into the canvas container reservoir. The bucket is not supported against movement or tilting when held in the basket.

Improvements to devices to hold practice balls continue to be sought.

BRIEF SUMMARY OF THE INVENTION

In a first embodiment of the invention, a bucket caddy or stand has a retainer defining at least three slot openings therethrough. Each slot opening receives one leg inserted through the slot opening. Each leg has a proximal end and a distal end and a central axis. Each leg has at its proximal end a shelf surface disposed at a first angle to the central axis and has a generally U-shaped hook disposed with its opening at a second angle to the central axis. In this first embodiment elastic bands removably connect at one end to a respective generally U-shaped hook and at their opposite end to a rim of the bucket to be held by the bucket caddy. The elastic bands each have a hook, such as an S-shaped hook, at their opposite ends that is configured to removably connect to the bucket rim. The elastic bands may comprise two loops of elastic band material joined together at a center section, leaving a loop at one end and a loop with the S-shaped hook at the other end.

In a second embodiment, the elastic bands remain connected to the U-shaped hooks at the proximal ends of the legs. The distal tip of each of the U-shaped hooks is bent so as to retain the loop at the one end of the elastic band inside the U-shaped hook.

In one embodiment, the shelf surfaces of the at least three legs each have a generally planar top surface and an opposite surface. In another embodiment, the shelf surfaces of the three legs each have a stepped top surface, with a first planar top surface portion and a second planar top surface portion separated by a bend in the top surface.

When the bucket caddy is in a bucket supporting configuration, the shelf surfaces of the at least three legs are directed radially inwardly toward the retainer, and preferably are disposed in a common plane. In the bucket supporting configuration, the generally U-shaped hook openings of the at least three legs are directed toward the support surface on which the bucket caddy is supported.

In one embodiment, the shelves of the legs are formed of an elastic material or coated with an elastic material. In addition, in this embodiment the U-shaped hooks of the legs are formed with an elastomeric material or coated with an elastomeric coating. Moreover, the hooks joined to the elastic bands may be formed of an elastomeric material or coated with an elastomeric coating. For example, the shelves of the legs, the U-shaped hooks of the legs, and the hooks joined to the elastic bands may be dip molded metal.

In the bucket supporting configuration, the legs are splayed apart with their central axes at angles to one another. In the storage configuration, with the bucket separated from the bucket caddy, the legs are disposed with their central axes parallel or substantially parallel to one another. A tape, such as a tape of Velcro or hook and loop fastener, may be joined at one end to one of the legs, and wrapped around the legs when the caddy is in its storage configuration. A handle for carrying the bucket caddy may be joined to one of the legs, such as the first leg.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a bucket caddy which is presently preferred. It should be understood, however, that the disclosure is not limited to the precise arrangements and instrumentalities shown. In the drawings.

DESCRIPTION OF THE DISCLOSURE

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
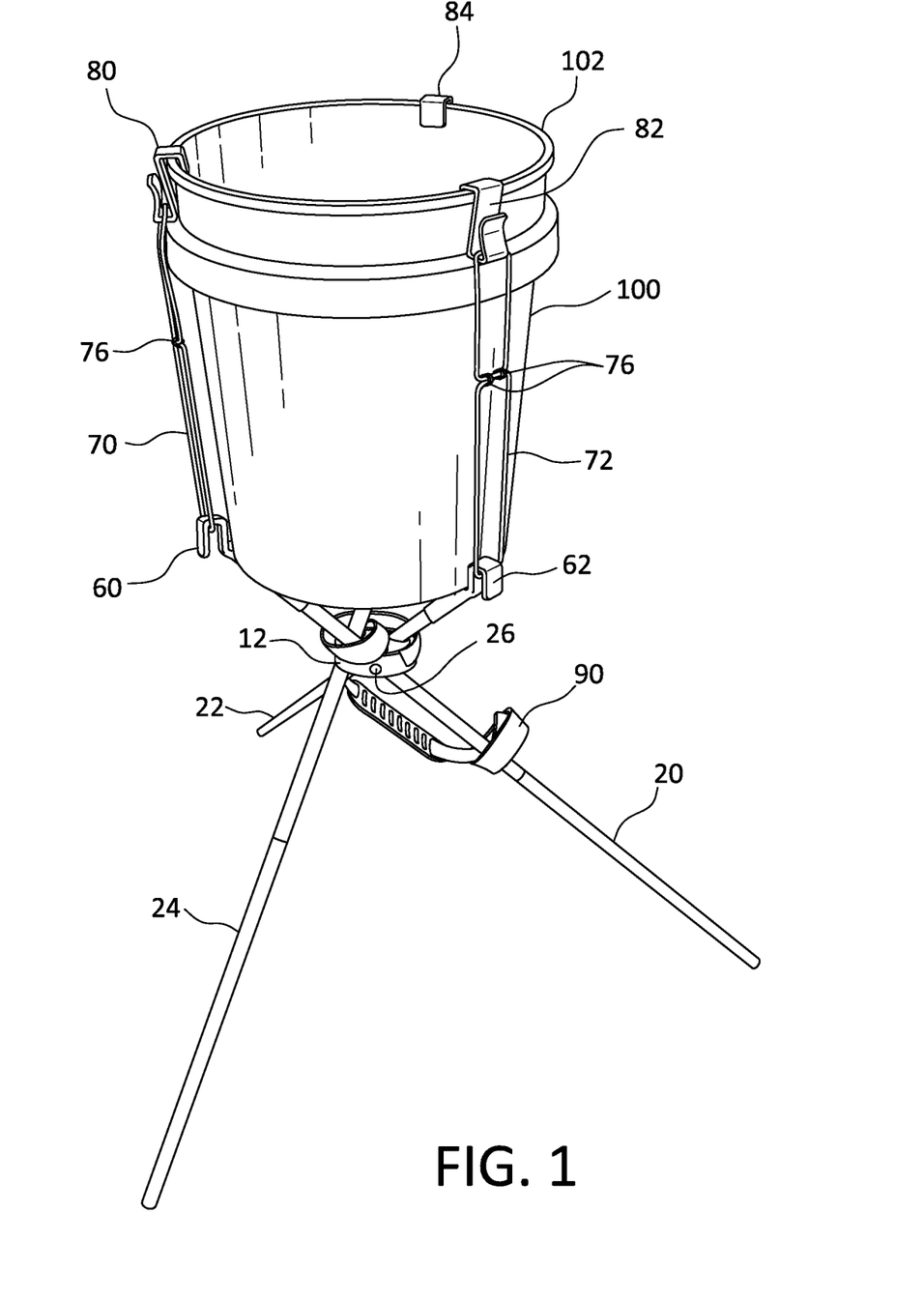
FIG. 1 is a right front perspective view of a first embodiment of a bucket caddy in a support configuration holding a bucket above a horizontal support surface.
Figures 5, 5A, 6:
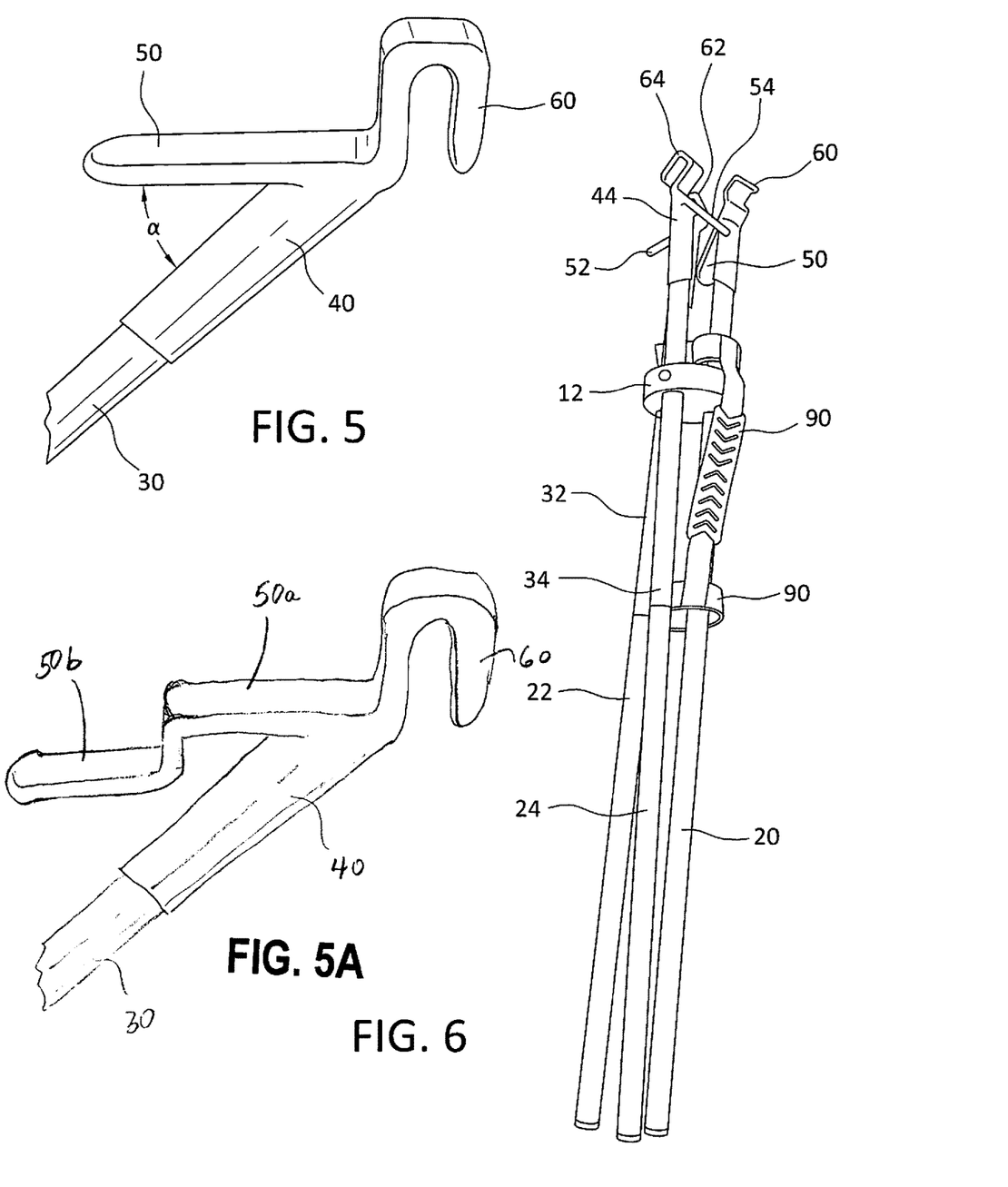
FIG. 5 is an enlarged view of the top of one leg of the bucket caddy of FIG. 1 showing the shelf and the U-shaped hook.
FIG. 5A is an enlarged view of the top of one leg of the bucket caddy of a variant with stepped shelf surfaces.
FIG. 6 is a right front perspective view of the bucket caddy of FIG. 1 in a folded configuration for storage.
Figure 7:
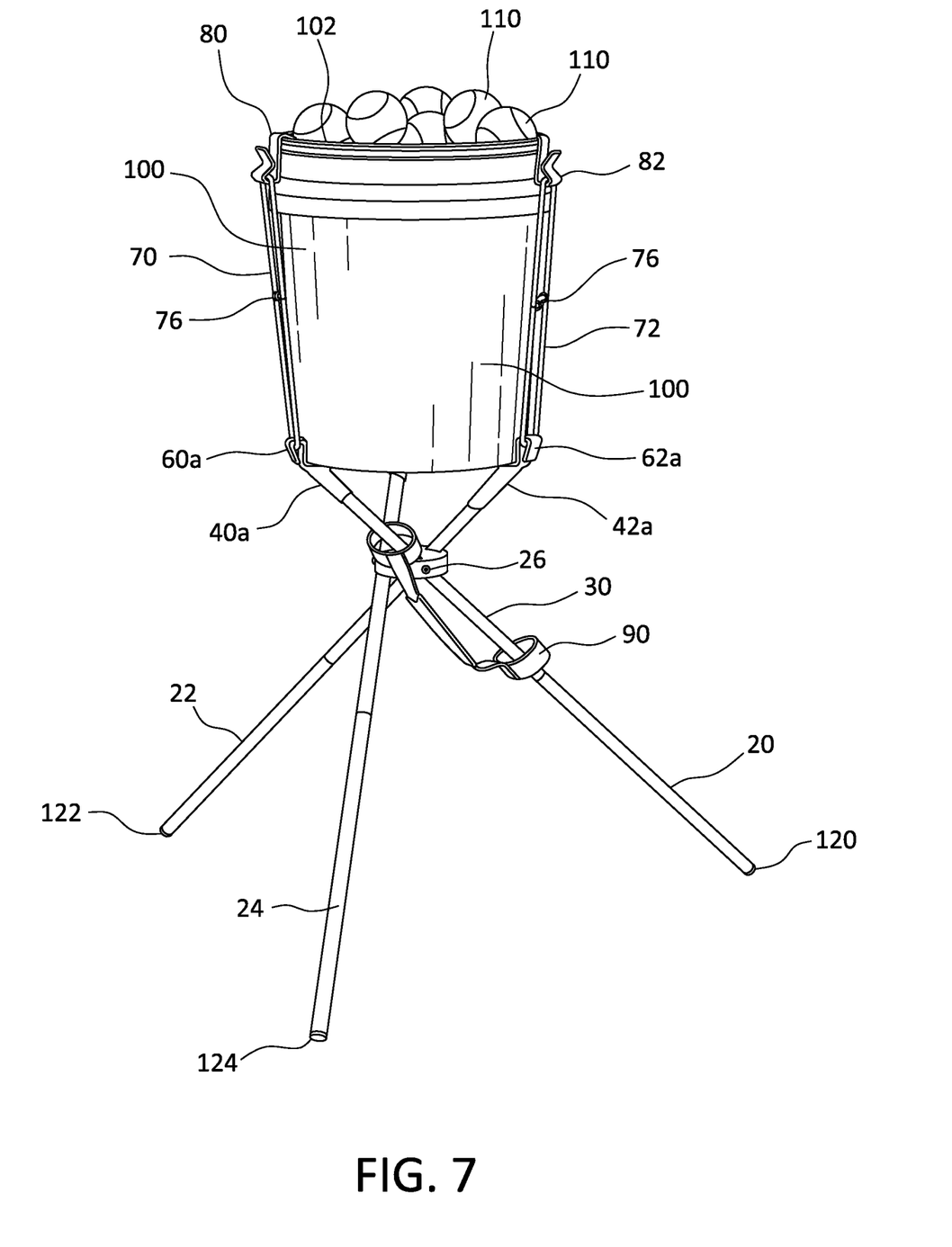
FIG. 7 is a right front perspective view of a second embodiment of a bucket caddy in a support configuration holding a bucket above a horizontal support surface.
Figure 8:
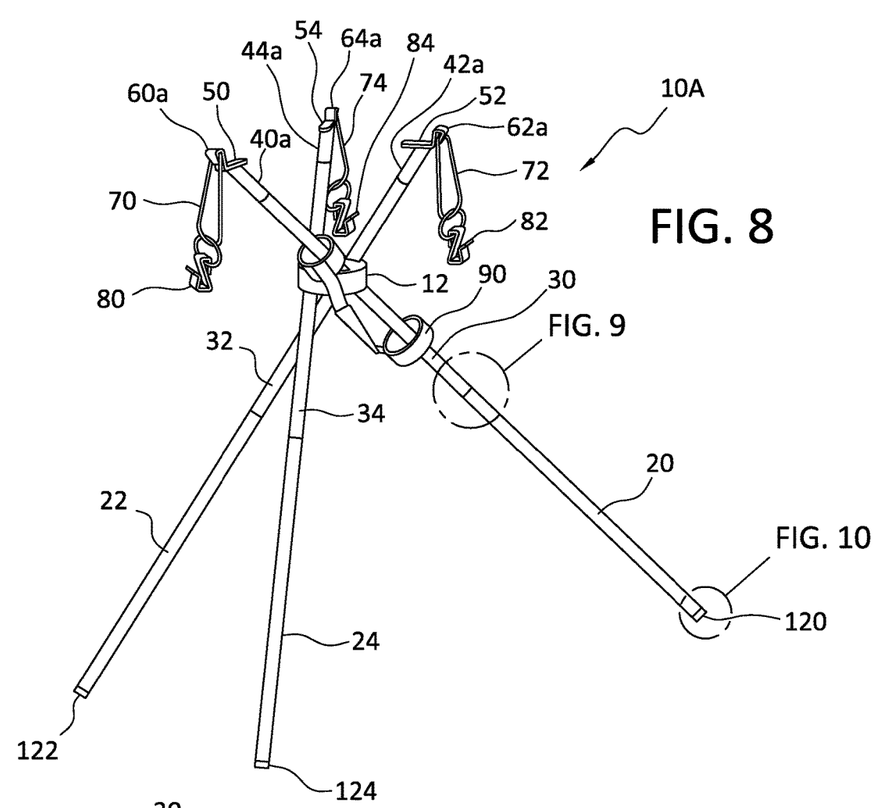
FIG. 8 is a right front perspective view of the bucket caddy of FIG. 7 without the bucket connected thereto.

Referring to the drawings in detail, FIGS. 1-6 show a first embodiment of a bucket caddy 10 according to the invention. A retainer 12 has three slot openings 14, 16, 18 in which the first, second and third legs 20, 22, 24 are held. The legs 20, 22, 24 may be pivoted on pins or fasteners 26, 28 across each respective slot opening and extending through the legs. The legs 20, 22, 24 pivot from a bucket-supporting configuration, as shown in FIG. 1, to a storage configuration as shown in FIG. 6.

Fittings 40, 42, 44 are installed on the top portions 30, 32, 34 of the legs 20, 22, 24. The fittings 40, 42, 44 each have a shelf surface 50, 52, 54 that extends away from the center axis of the respective fitting at an angle a thereto. When the bucket caddy 10 is in the bucket-supporting configuration, the shelf surfaces 50, 52, 54 are disposed generally in a same or substantially same plane and are thus configured to support thereon a bottom surface of the bucket 100.

The fittings 40, 42, 44 terminate at their distal ends at U-shaped hooks 60, 62, 64. The U-shaped hooks 60, 62, 64 each receive a respective elastic cord or bungee 70, 72, 74 used to engage the bucket 100 to the bucket caddy 10. Preferably, the elastic cords or bungees are double cords, with two loops of elastic cords joined together with a crimp fastener 76. The double cords have enhanced strength as compared a single loop cord.

S-shaped hooks 80, 82, 84 are joined to the opposite ends of the elastic cords or bungees 70, 72, 74. The S-shaped hooks 80, 82, 84 grip the upper rim 102 of the bucket 100. The bucket 100 is secured to the caddy 10 with three elastic bands 70, 72, 74. Each band 70, 72, 74 loops through the generally U-shaped hook portion 60, 62, 64 of a leg, and the S-shaped hook portion 80, 82, 84 at the opposite end of the band 70, 72, 74 grips the upper rim 102 of the bucket 100.

Figure 2:
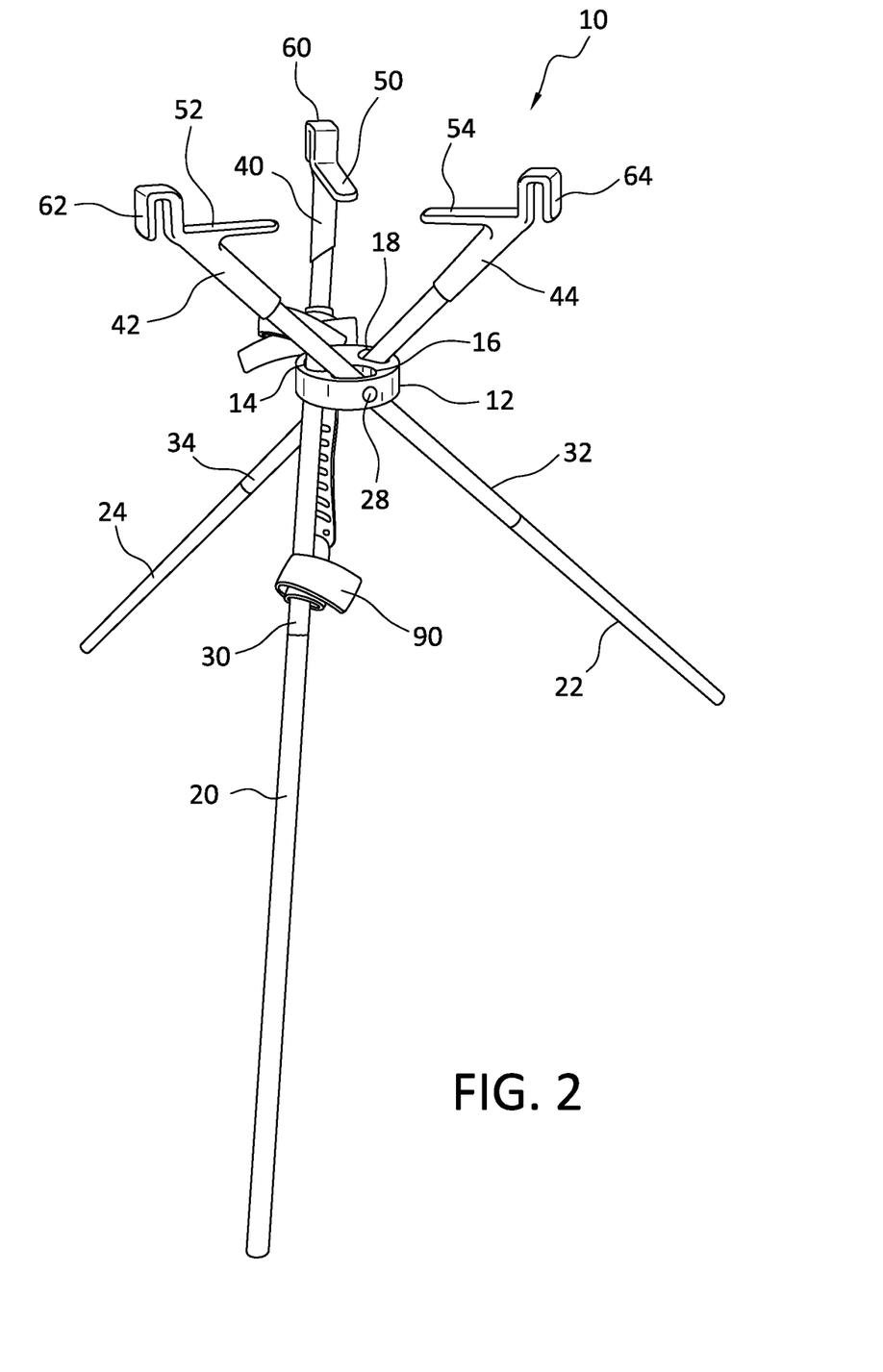
FIG. 2 is a right front perspective view of the bucket caddy of FIG. 1 without the bucket connected thereto.

FIG. 2 shows the bucket caddy in the bucket-support configuration. The three legs 20, 22, 24 are held in individual slots 14, 16, 18 in the disc-shaped retainer 12. The legs 20, 22, 24 are movable, e.g., pivotable or rotatable, from a storage configuration such as shown in FIG. 6 to the support configuration such as shown in FIG. 2. Each leg 20, 22, 24 defines its own central axis along its length. In the storage configuration, the central axes of the legs 20, 22, 24 are parallel or generally parallel to one another. In the support configuration, the central axes of the legs 20, 22, 24 are at angles to one another, with the legs 20, 22, 24 splayed apart to create a tripod or stand. In one embodiment, in the support configuration, the center axes of the legs 20, 22, 24 are at angles in a range of from 40 degrees to 50 degrees from vertical. The leg height is sufficient to hold the shelf surfaces 50, 52, 54 about 25 to 35 inches above the horizontal support surface, such as the ground. Preferably, the leg height is sufficient to hold the shelf surfaces 50, 52, 54 from 28 to 30 inches above the horizontal support surface. For example, the legs 20, 22, 24 may be 30 to 34 inches long. Each leg 20, 22, 24 has at its distal end a footing to contact the ground or support surface.

Referring to FIG. 5, each leg 20 has at its proximal end 30 a fitting 40 that has a shelf surface 50 that is disposed at an angle a to the central axis of the leg 20. Preferably, the angle a is in the range from 20 to 90 degrees. Each leg 20 further has a generally U-shaped hook 60 at its proximal end. The generally U-shaped hook 60 is disposed at an angle to the central axis of the leg 20. Preferably, the angle is in the range from 20 to 90 degrees. The U-shaped hook 60 may be positioned at a rear portion of the shelf 50. The shelf 50 and U-shaped hook 60 may comprise a unitary element joined to the proximal end 30 of the leg 20.

When the legs 20, 22, 24 are splayed to the support configuration, the shelf surfaces 50, 52, 54 are directed radially inwardly toward the retainer 12 and the tops of the shelf surfaces 50, 52, 54 are held in a common plane. The shelf surfaces 50, 52, 54 of this embodiment are flat, and adapted to receive the bottom of the large bucket 100. The generally U-shaped hook openings 60, 62, 64 are pointed with the open side directed toward the ground or support surface.

Alternatively, the shelf surfaces 50, 52, 54 of the legs maybe stepped, such that a first top shelf portion 50a may be adapted to receive the bottom of a large bucket, but the stepped lower shelf portion 50b may be adapted to receive the bottom of a smaller bucket having a smaller diameter or footprint, such as a paint can. See FIG. 5A showing such an alternative shelf surface with a top shelf portion 50a and a stepped lower shelf portion 50b having a shelf surface in a plane different from the plane of the shelf surface of the top shelf portion 50a, with the top shelf portion 50a separated from the lower shelf portion 50b by a bend.

The legs 20, 22, 24 may be formed of a metal, such as steel, or of a composite, such as fiberglass. For example, the legs may be of tubular metal having a diameter of 16 mm with a wall thickness of 1.2 mm with a length of 800 mm. The legs 20, 22, 24 may be formed in two sections, e.g., 20 and 30, 22 and 32 and 24 and 34, with the bottom section threadedly engagable to the top section, such as a top section of 400 mm length and a bottom section of 400 mm length.

Each shelf 50, 52, 54 may be formed of metal, such as steel, and coated with an elastomeric coating. Each shelf alternatively may be formed of an elastomer, such as a rubber. Preferably, the shelf top surface is grip-able or tacky. Each shelf may be formed of dip-molded metal to create the gripping or frictional engagement between the bottom of the bucket and the shelf that prevents the bucket from sliding. A shelf formed of sheet steel that is dip molded with an elastomeric coating is preferred.

Different sized buckets in terms of bucket diameter or footprint may be accommodated on the shelf due to the frictional engagement of the elastomeric coating with the bucket bottom. More particularly, for the embodiment with stepped shelf surfaces, a smaller diameter bucket may be accommodated on the lower stepped surface. With or without the stepped shelf surfaces, different sized buckets in terms of bucket height may be held on the caddy due to the flexible nature of the elastic band or bungee cord attachments to the hooks of the shelves.

The U-shaped hooks 60, 62, 64 may be formed of metal, such as steel, and coated with an elastomeric coating. The U-shaped hooks 60, 62, 64 alternatively may be formed of an elastomer, such as rubber.

Figures 3, 4:
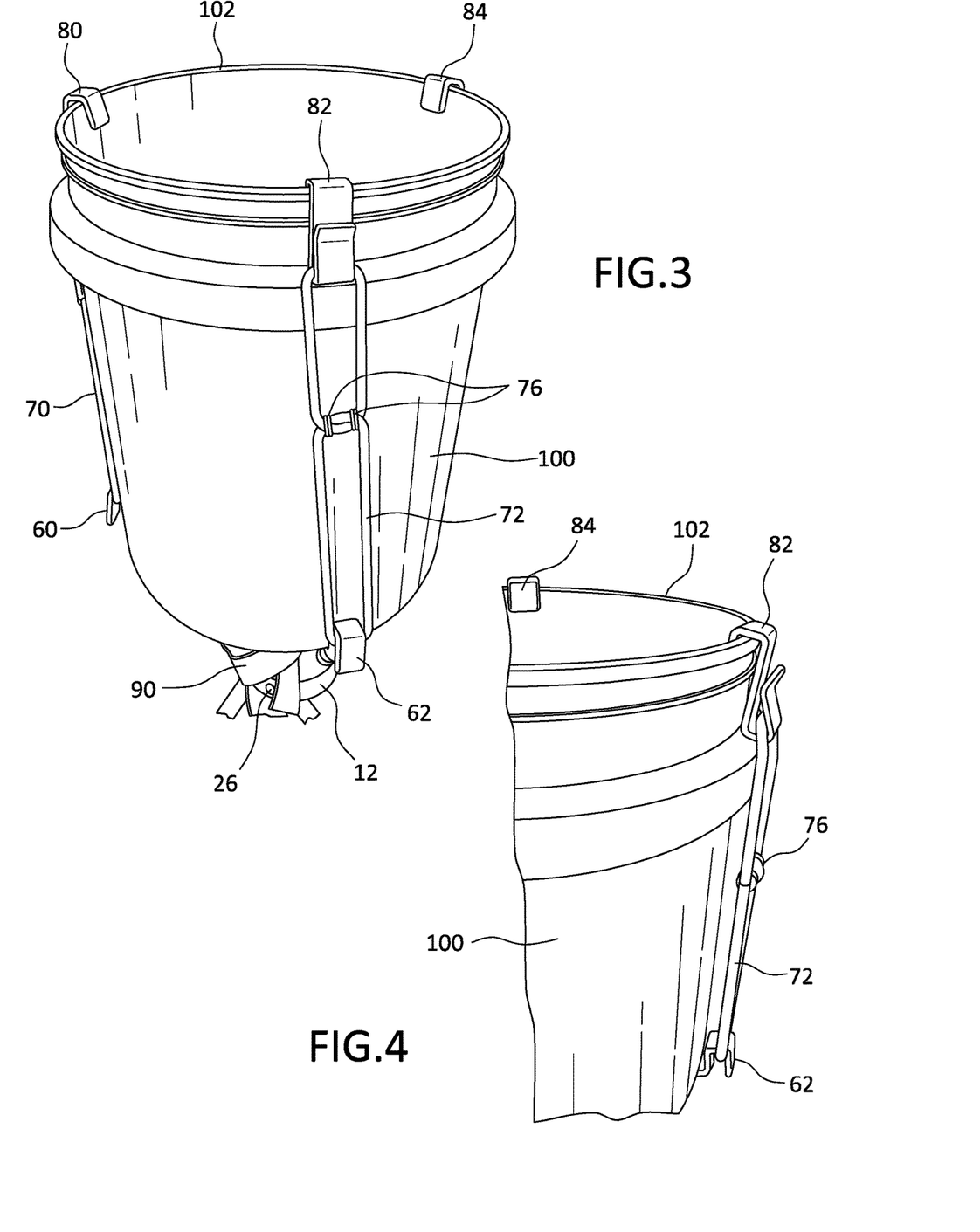
FIG. 3 is a right front perspective view of the bucket held to the bucket caddy of FIG. 1 showing connection of the bucket to the bucket caddy with an elastic band having a hook over the bucket lip and having an end linked to a U-shaped hook at the top of one leg of the bucket caddy.
FIG. 4 is a partial left side elevational view of the elastic band having a hook over the bucket lip and having an end linked to a U-shaped hook at the top of one leg of the bucket caddy of FIG. 1.

The elastic bands 70, 72, 74 preferably are bungee cords with a diameter from 0.2 to 0.5 inch and a length of from 10 to 12 inches. A double bungee loop such as shown in FIGS. 1, 3 and 4 is preferred for added strength.

A Velcro tape or hook and loop fastener tape 90 is appended to the first leg 20. When in the storage configuration shown in FIG. 6, the tape 90 may be wrapped around all three of the legs 20, 22, 24 to secure the legs with their leg axes in a parallel or substantially parallel orientation. The tape 90 may also form a handle by which the bucket caddy 10 may be carried when in the storage configuration.

Referring next to the embodiment shown in FIGS. 7-10, an alternative bucket caddy 10A is shown. In these figures, the structural elements are identified with the identical reference numbers where the elements are the same as those of the embodiment of FIGS. 1-6. The bucket caddy 10A is shown in bucket support configuration in FIGS. 7 and 8. Baseballs 110 are held inside the bucket 100 that is supported on the bucket caddy 10A. Different from the first embodiment, the bucket caddy 10A has different fittings 40a, 42a, 44a with shelf surfaces 50, 52, 54 at the top of the legs 20, 24, 26. The fittings 40a, 42a, 44a feature U-shaped hooks 60a, 62a, 64a with terminal ends thereof that are more closely crimped to the fitting side surfaces so that the elastic cords or bungees 70, 72, 74 are retained in the U-shaped hooks 60a, 62a, 64a. In the first embodiment (FIGS. 1-6) the elastic cords or bungees 70, 72, 74 were separable from the U-shaped hooks 60, 62, 64. In the second embodiment (FIGS. 7-10) the elastic cords or bungees 70, 72, 74 are intended to remain held in the U-shaped hooks 60a, 62a, 64a.

Figure 9:
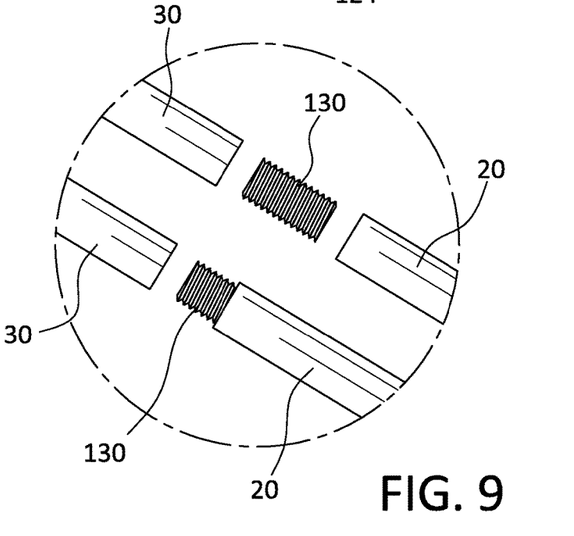
FIG. 9 is an enlarged detail of the connection of the lower leg portion to the upper leg portion of the bucket caddy of FIG. 8.

The top portions of the legs 30, 32, 34 are joined to the bottom portions of the legs 20, 22, 24 with threaded fittings 130. In this embodiment as shown in FIG. 9, the top portions of the legs 30, 32, 34 are internally threaded tubes, and the bottom portions of the legs 20, 22, 24 are internally threaded tubes. The fitting 130 has external threads that join to each of the threaded sections of the tubes.

Figure 10:
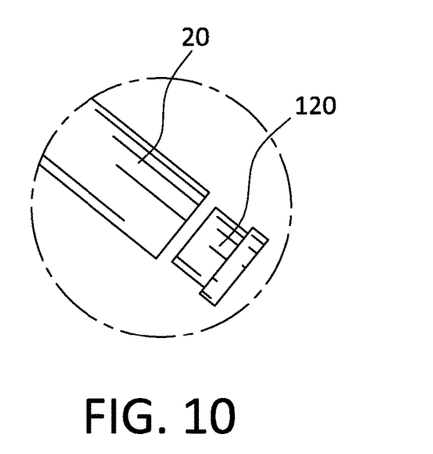
FIG. 10 is an enlarged detail of the foot connected to the bottom of the lower leg portion of the bucket caddy of FIG. 8.

Footers 120, 122, 124 may be joined to the bottom ends of the legs 20, 22, 24. As shown in FIG. 10, the footer 120 is inserted into the hollow tube end of the leg 20 and held therein with an interference fit.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

REFERENCE NUMERALS 10 bucket caddy
10A bucket caddy
12 retainer
14 slot opening
16 slot opening
18 slot opening
20 first leg
22 second leg
24 third leg
26 pivot
28 pivot
30 top portion of first leg
32 top portion of second leg
34 top portion of third leg
340 fitting on first leg
42 fitting on second leg
44 fitting on third leg
50 shelf
52 shelf
54 shelf
60 U-shaped hook
60A U-shaped hook
62 U-shaped hook
62A U-shaped hook
64 U-shaped hook
64A U-shaped hook
70 elastic cord
72 elastic cord
74 elastic cord
76 crimp
80 S-shaped hook
82 S-shaped hook
84 S-shaped hook
90 fastener tape
100 bucket
102 bucket rim
110 baseball
120 footer
122 footer
124 footer
130 fastener

I claim:

1. A bucket caddy, comprising:
a retainer defining at least three slot openings therethrough;
a first leg inserted into the first slot opening, said first leg having a proximal end and a distal end and a central axis, said first leg having at its proximal end a shelf surface disposed at a first angle to the central axis and having a first generally U-shaped hook disposed with its opening at a second angle to the central axis;
a second leg inserted into the second slot opening, said second leg having a proximal end and a distal end and a second leg central axis, said second leg having at its proximal end a second leg shelf surface disposed at a first angle to the second leg central axis and having a second generally U-shaped hook disposed with its opening at a second angle to the second leg central axis;
a third leg inserted into the third slot opening, said third leg having a proximal end and a distal end and a third leg central axis, said third leg having at its proximal end a third leg shelf surface disposed at a first angle to the third leg central axis and having a third generally U-shaped hook disposed with its opening at a third angle to the third leg central axis;
a first elastic band configured to connect at one end with the opening of the first generally U-shaped hook, and having a fastening hook at its opposite end configured to removably connect to a rim of a bucket;
a second elastic band configured to connect at one end with the opening of the second generally U-shaped hook, and having a second fastening hook at its opposite end configured to removably connect to the rim of the bucket; and a third elastic band configured to connect at one end with the opening of the third generally U-shaped hook, and having a third fastening hook at its opposite end configured to removably connect to the rim of the bucket.

2. The bucket caddy of claim 1, wherein the shelf surface, the second leg shelf surface and the third leg shelf surface each have a generally planar top surface and an opposite surface.

3. The bucket caddy of claim 1, wherein the shelf surface, the second leg shelf surface and the third leg shelf surface each have a stepped top surface, with a first planar top surface portion and a second planar top surface portion separated by a bend in the top surface.

4. The bucket caddy of claim 1, wherein the fastening hook, second fastening hook and third fastening hook each have an S-shape with a first curved portion and a second curved portion that is configured to hold a respective one of the elastic bands in the first curved portion and to grippingly connect to the rim of the bucket with the second curved portion.

5. The bucket caddy of claim 1, wherein the first elastic band comprises two loops of bungee cord joined together.

6. The bucket caddy of claim 1, wherein when the bucket caddy is in a bucket supporting configuration, the shelf surface of the first leg is directed radially inwardly toward the retainer, the second leg shelf surface is directed radially inwardly toward the retainer, and the third leg shelf surface is directed radially inwardly toward the retainer.

7. The bucket caddy of claim 6, wherein the first leg shelf surface, the second leg shelf surface and the third leg shelf surface are disposed in a common plane when the bucket caddy is in the bucket supporting configuration.

8. The bucket caddy of claim 1, wherein when the bucket caddy is in a bucket supporting configuration, the opening of the first generally U-shaped hook is directed toward a support surface on which the bucket caddy is supported, the opening of the second generally U-shaped hook is directed toward the support surface on which the bucket caddy is supported; and the opening of the third generally U-shaped hook is directed toward the support surface on which the bucket caddy is supported.

9. The bucket caddy of claim 1, wherein the first leg shelf, the second leg shelf and the third leg shelf are formed of an elastomeric material or coated with an elastomeric coating.

10. The bucket caddy of claim 1 wherein the first generally U-shaped hook, the second generally U-shaped hook and the third generally U-shaped hook are formed with an elastomeric material or coated with an elastomeric coating.

11. The bucket caddy of claim 1, wherein the fastening hook, the second fastening hook and the third fastening hook are formed with an elastomeric material or coated with an elastomeric coating.

12. The bucket caddy of claim 1, wherein the first leg, second leg and third leg are splayed apart with their central axes at angles to one another when the bucket caddy is in the support configuration, and the first leg, second leg and third leg are disposed with their central axes parallel or substantially parallel when the bucket caddy is in a storage configuration.

13. The bucket caddy of claim 1, further comprising a tape of hook and loop fastener material joined at one end to one of the first leg, second leg or third leg and having an opposite end, said tape configured to wrap around the first leg, second leg and third leg when the caddy is in a storage configuration.

14. The bucket caddy of claim 1, wherein the first elastic band is configured to removably connect at one end with the opening of the first generally U-shaped hook, the second elastic band is configured to removably connect at one end with the opening of the second generally U-shaped hook, and the third elastic band is configured to removably connect at one end with the opening of the third generally U-shaped hook.

15. The bucket caddy of claim 1, wherein at least the first generally U-shaped hook of the first leg is bent so that a distal end contacts or nearly contacts a side surface of the first leg.

16. The bucket caddy of claim 1, further comprising a bucket.

* * * * *